(12) United States Patent
Swift-Spong et al.

(10) Patent No.: US 12,014,429 B2
(45) Date of Patent: Jun. 18, 2024

(54) CALIBRATED RISK SCORING AND SAMPLING

(71) Applicant: Intuit Inc., Mountain View, CA (US)

(72) Inventors: Kate Elizabeth Swift-Spong, San Diego, CA (US); Shivakumara Narayanaswamy, Mountain View, CA (US); Carlos A. Oliveira, Aurora, CO (US); Byungkyu Kang, San Diego, CA (US); Farzaneh Khoshnevisan, San Diego, CA (US); Zhewen Fan, San Diego, CA (US); Runhua Zhao, Milpitas, CA (US); Wan Yu Zhang, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/390,816

(22) Filed: Jul. 30, 2021

(65) Prior Publication Data
US 2023/0036688 A1 Feb. 2, 2023

(51) Int. Cl.
| | |
|---|---|
| G06Q 20/20 | (2012.01) |
| G06F 18/214 | (2023.01) |
| G06F 18/243 | (2023.01) |
| G06N 20/20 | (2019.01) |
| G06Q 10/0635 | (2023.01) |
| G06Q 40/12 | (2023.01) |

(52) U.S. Cl.
CPC ....... *G06Q 40/123* (2013.12); *G06F 18/2148* (2023.01); *G06F 18/24323* (2023.01); *G06N 20/20* (2019.01); *G06Q 10/0635* (2013.01); *G06Q 20/20* (2013.01)

(58) Field of Classification Search
None
See application file for complete search history.

(56) References Cited

U.S. PATENT DOCUMENTS

| | | | |
|---|---|---|---|
| 9,721,296 B1 * | 8/2017 | Chrapko | G06N 7/01 |
| 2018/0033089 A1 * | 2/2018 | Goldman | H04L 63/102 |
| 2018/0183827 A1 * | 6/2018 | Zorlular | H04L 63/1416 |
| 2019/0066248 A1 * | 2/2019 | McEachern | G06Q 40/10 |
| 2020/0104911 A1 * | 4/2020 | Suvajac | G06N 3/04 |
| 2020/0210771 A1 * | 7/2020 | Zeng | G06N 20/20 |
| 2020/0372424 A1 * | 11/2020 | Zhang | G06N 7/00 |
| 2021/0264520 A1 * | 8/2021 | Cummings | G06Q 40/12 |
| 2021/0334895 A1 * | 10/2021 | Kumar | H04L 9/3239 |

* cited by examiner

*Primary Examiner* — William J Jacob
(74) *Attorney, Agent, or Firm* — Lathrop GPM LLP

(57) ABSTRACT

A method implements calibrated risk scoring and sampling. Features are extracted from a record. A risk score, associated with the record, is generated from the features using a machine learning model. The record is mapped to a risk bucket using the risk score. The risk bucket may include multiple risk bucket records. The record is selected from the risk bucket records with a sampling threshold corresponding to the risk bucket. A form prepopulated with values from the record is presented to a client device.

20 Claims, 7 Drawing Sheets

CALIBRATED RISK SCORING AND SAMPLING

BACKGROUND

Online services are used to prepare and store tax returns as records. The records may be prepared by an expert but may still include errors that should be reviewed. A challenge is to provide a computing system that determines the probability that a record for a tax return includes an error, selects one of a group of erroneous returns to display to a reviewer, and is updated continuously for seasonal fluctuations.

SUMMARY

In general, in one or more aspects, the disclosure relates to a method that implements calibrated risk scoring and sampling. Features are extracted from a record. A risk score, associated with the record, is generated from the features using a machine learning model. The record is mapped to a risk bucket using the risk score. The risk bucket includes multiple risk bucket records. The record is selected from the risk bucket records with a sampling threshold corresponding to the risk bucket. A form prepopulated with values from the record is presenting to a client device.

In general, in one or more aspects, the disclosure relates to a system that includes a machine learning model and a server application. The machine learning model is trained to generate a risk score from features extracted from a record. The server application executes on one or more servers. Features are extracted from a record. The risk score, associated with the record, is generated from the features using the machine learning model. The record is mapped, with a mapping application, to a risk bucket using the risk score. The risk bucket may include multiple risk bucket records. The record is selected with a sampling application from the risk bucket records using a sampling threshold corresponding to the risk bucket. A form prepopulated with values from the record is presenting to a client device.

In general, in one or more aspects, the disclosure relates to a method. A record is received. features are extracted from the record. A risk score, associated with the record, is generated from the features using a machine learning model. The record is mapped to a risk bucket using the risk score. The risk bucket may include multiple risk bucket records. The record is selected from the plurality of risk bucket records using a sampling threshold corresponding to the risk bucket. A form prepopulated with values from the record is presented.

Other aspects of the invention will be apparent from the following description and the appended claims.

BRIEF DESCRIPTION OF DRAWINGS

FIG. 3, FIG. 4A, and FIG. 4B show examples in accordance with disclosed embodiments.

DETAILED DESCRIPTION

Figure 1:
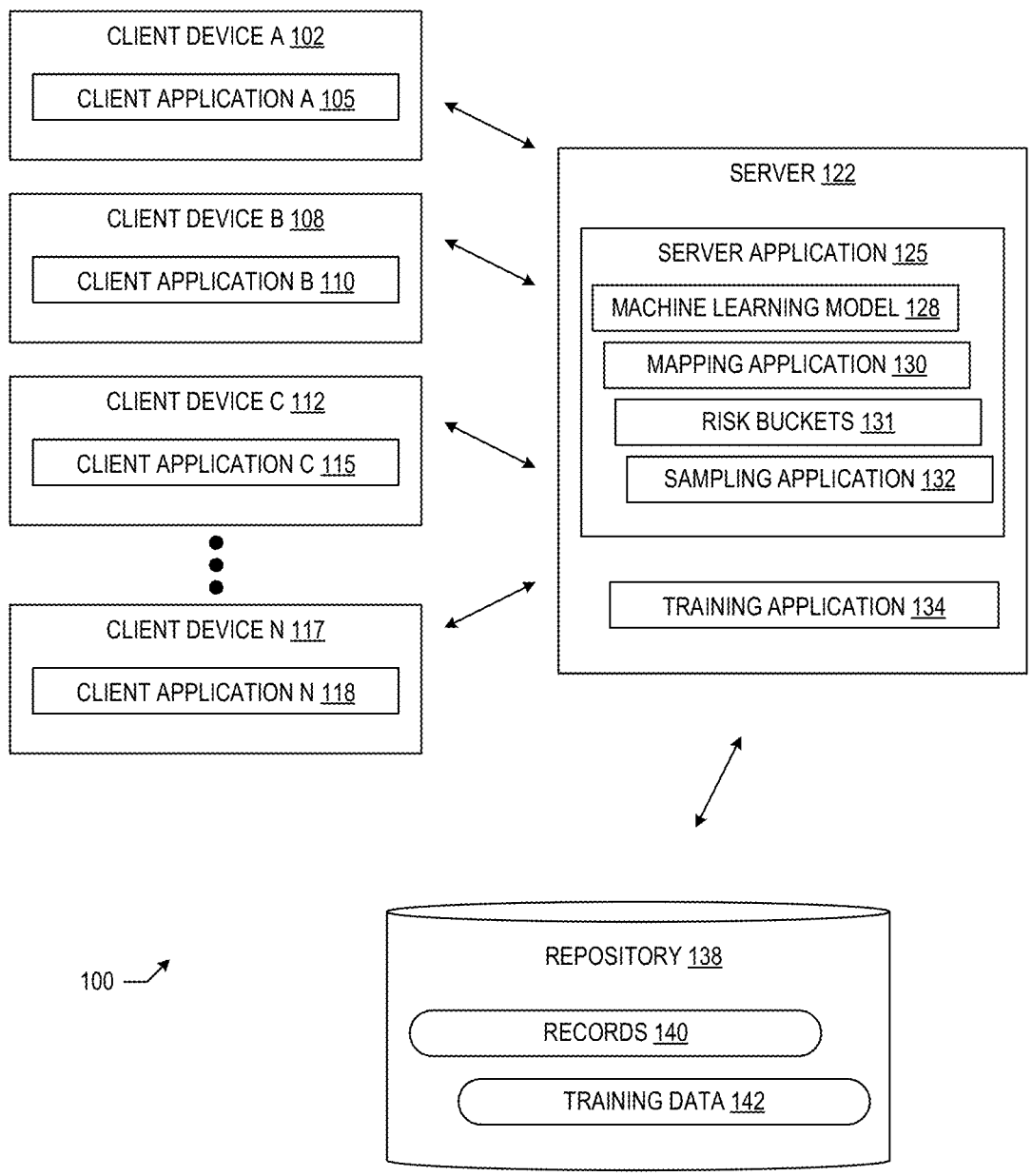
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

After a tax expert is done preparing a return the system uses a machine learning model to predict the probability that the return has an error and then uses the probability to determine a "risk bucket" for the return. Returns are then randomly sampled from each risk bucket to send for review. Bucketing the returns based on error probability enables sampling flexibility in that each bucket can be sampled at a different rate. Additionally, the mapping between error probabilities and risk buckets may be continuously updated to account for seasonal fluctuations.

In general, systems for calibrated risk scoring and sampling prepare data, train machine models, calibrate the risk buckets, make predictions and perform bucketing at runtime, update the risk bucket calibrations, and use a pipeline to automatically update the risk bucket calibrations.

Data is prepared by labeling tax returns that have been previously reviewed. The tax returns include inputs such as filing status, taxpayer age, various line item values, number of forms, number of states, and SKU (i.e., and identifier for the type of tax preparation product or service used by a customer) at two time points 1) immediately after an expert has finished preparing a tax return and 2) the most recent version of the return after filing (which may include updates). Using these two "snapshots" of a tax return, it is determined if any change were made between when the expert finished preparing the return and when the return was filed. The set of returns are then filtered (for model training) to include returns where either 1) there was a change in the return between the two "snapshots" and an error was identified in the return or 2) there was no change in the return between the two "snapshots" and no error was identified in the return. Filtering in this manner removes noise from the training labels for the tax returns.

The labeled tax returns are used to train a machine learning model that predicts whether a tax return includes an error. In one embodiment, the tax return inputs and error labels are used to train a gradient boosted decision tree classification model (e.g., XGBoost) to predict if a return has an error.

The risk buckets are calibrated prior to use. The probabilities ("risk scores") that are output from the machine learning model for a set of recently completed tax returns are used to create quantile thresholds. The quantile thresholds (also referred to as risk bucket thresholds) are based on ordered risk scores from those returns used to generate the probabilities. The risk bucket calibration process creates risk bucket thresholds that are used to bucket or group records of tax returns at runtime. In one embodiment, each risk bucket may be between two risk bucket thresholds. If the value of a risk score falls between the two risk bucket thresholds, then the tax return (corresponding to the risk score) is assigned to the risk bucket (corresponding to the two risk bucket thresholds).

The machine learning model and bucketing are used at runtime. The machine learning model is a classification model and is run on the record of a tax return after a tax return has been prepared. The risk score generated from the tax return is then assigned a risk bucket using the risk bucket thresholds.

The calibration of the risk buckets may be updated. During a tax season, the complexity of tax returns being prepared can change to increase or decrease over time. These changes impact the distribution of risk scores. For example, if the complexity increases, the number of returns with higher risk scores might increase causing an imbalance in the number of returns in each risk bucket. The system may automatically address this issue by pulling recent risk score outputs from the model and creating new risk bucket calibrations on a daily basis. The new risk bucket calibrations may be persisted to a feature store and accessed during inference to avoid downtime.

A pipeline may be used for risk bucket calibration. Model inputs (records of tax returns) and outputs (risk scores and risk bucket thresholds) with timestamps may be persisted to a repository. Based on a lookback period (also referred to as a data window), historical model output can be fetched from the repository. Calibration scripts fetch and compute calibrations based on a lookback period. Scripts may also project the last 24 hours data with using a new calibration and persist results to the repository. In one embodiment, different calibrations (i.e., sets of risk bucket thresholds) are compared to identify a calibration that minimizes the standard deviation of the number of tax returns in each bucket. For example, with 100 tax returns and 10 risk buckets, each risk bucket may contain 10 tax returns when the risk bucket thresholds are calibrated.

FIG. 1 shows a diagram of embodiments that are in accordance with the disclosure. FIG. 1 shows a diagram of the system (100) that implements calibrated risk scoring and sampling. The embodiments of FIG. 1 may be combined and may include or be included within the features and embodiments described in the other figures of the application. The features and elements of FIG. 1 are, individually and as a combination, improvements to machine learning and form preparation technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) uses calibrated risk scoring and sampling to select tax returns for review. The system (100) includes the client device A (102), the client device B (108), the client device C (112), and the client device N (117), the server (122), and the repository (138). While depicted using a client server architecture, embodiments of the system (100) may be implemented on a single computing system.

Figure 5A:
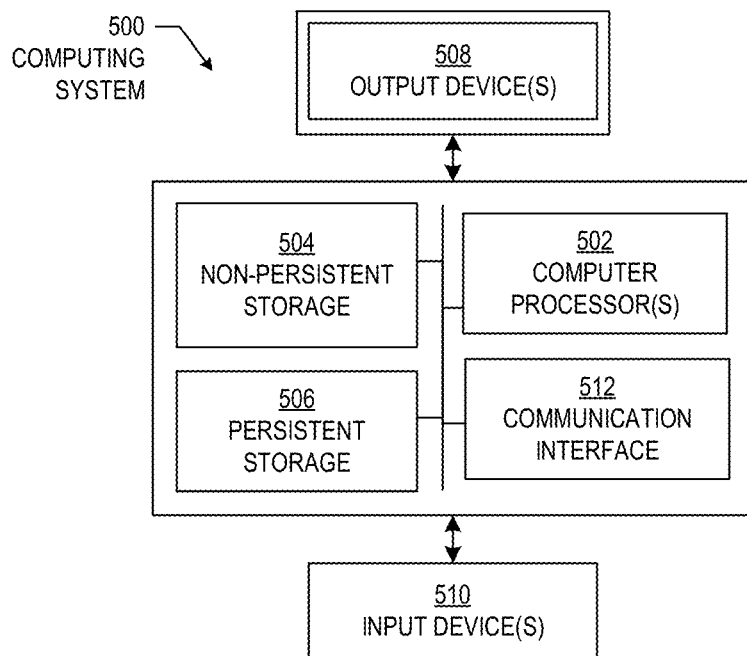
FIG. 5A and FIG. 5B show computing systems in accordance with disclosed embodiments.

The client devices A (102), B (108), C (112), and N (117) are computing systems (further described in FIG. 5A). For example, the client devices A (102), B (108), C (112), and N (117) may be desktop computers, mobile devices, laptop computers, tablet computers, etc. The client devices A (102), B (108), C (112), and N (117) respectively include the client applications A (105), B (110), C (115), and N (118).

The client applications A (105), B (110), C (115), and N (118) are programs running on the client devices A (102), B (108), C (112), and N (117). The client applications A (105), B (110), C (115), and N (118) are operated by the users of the system (100). In one embodiment, the users of the system include a customer for whom a form is being prepared, a preparer who is preparing the form, a reviewer that reviews the form, and a developer maintaining the system. The client applications A (105), B (110), C (115), and N (118) may be native applications or may be browser applications that send and receive messages to and from the applications hosted by the server (122).

In one embodiment, a customer may use the client device A (102) to enter data for the fields of a form; a preparer may use the client device B (108) to prepare the form; and a reviewer may use the client device C (112) to review a form that has been prepared. In one embodiment, the form may include a tax return with the forms and schedules used for the tax return. A developer may use the client device N (117) to maintain the system (100) by training machine learning models, calibrating mappings, and controlling training and mapping schedules.

The server (122) is a computing system (further described in FIG. 5A). The server (122) may include multiple physical and virtual computing systems that form part of a cloud computing environment. In one embodiment, execution of the programs and applications of server (122) is distributed to multiple physical and virtual computing systems in the cloud computing environment. In one embodiment, the server (122) includes the server application (125) and the training application (134).

The server application (125) is a collection of programs that may execute on the server (122). In one embodiment, the server application hosts a website accessed by the client applications A (105), B (110), C (115), and N (118). The server application (125) includes the machine learning model (128), the mapping application (130), and the sampling application (132).

The machine learning model (128) is a set of programs running as part of the server application (125). The machine learning model (128) may include a decision tree model, which may be gradient boosted.

The mapping application (130) is a program that operates as part of the server application (125). The mapping application (130) maps records to the risk buckets (131).

The risk buckets (131) are data structures that identify collections of records that have similar risk scores. For example, when two records are mapped to the same risk bucket, each of the records may have about the same probability of including an error in the form represented by the record.

The sampling application (132) is a program that operates as part of the server application (125). The sampling application (132) samples records from the risk buckets (131). The sampled records may be presented to a reviewer operating one of the client devices A (102), B (108), C (112), and N (117).

The training application (134) is a collection of programs that may execute on the server (122). The training application (134) trains the machine learning model (128) and generates the calibrations used to map the records (140) to the risk buckets (131). The training application (134) may be controlled by a developer using one of the client devices A (102), B (108), C (112), and N (117).

The repository (138) is a computing system that may include multiple computing devices in accordance with the computing system (500) and the nodes (522) and (524) described below in FIGS. 5A and 5B. The repository (138) may be hosted by a cloud services provider that also hosts the server (122). The cloud services provider may provide hosting, virtualization, and data storage services as well as other cloud services and to operate and control the data, programs, and applications that store and retrieve data from the repository (138). The data in the repository (138) includes the records (140) and the training data (142).

The records (140) are the electronic records that store the values of the forms processed by the system. For example, the forms may be tax returns and the records (140) may store the values used in the fields of the tax returns. Each record may include multiple snapshots at different points of time. For example, snapshots for a record of a form may include a snapshot of the original data entry after data is received from a customer, a snapshot after the form has been prepared by a preparer, a snapshot after the from has been reviewed by a reviewer, a snapshot after the form has been filed, etc.

The training data (142) is the data used to train the models and mappings of the system (100). The training data may include historical records of forms and labels for the records. The labels may identify if a record was changed after being prepared and before being filed, which may also serve to identify if the record included an error.

Figure 2A:
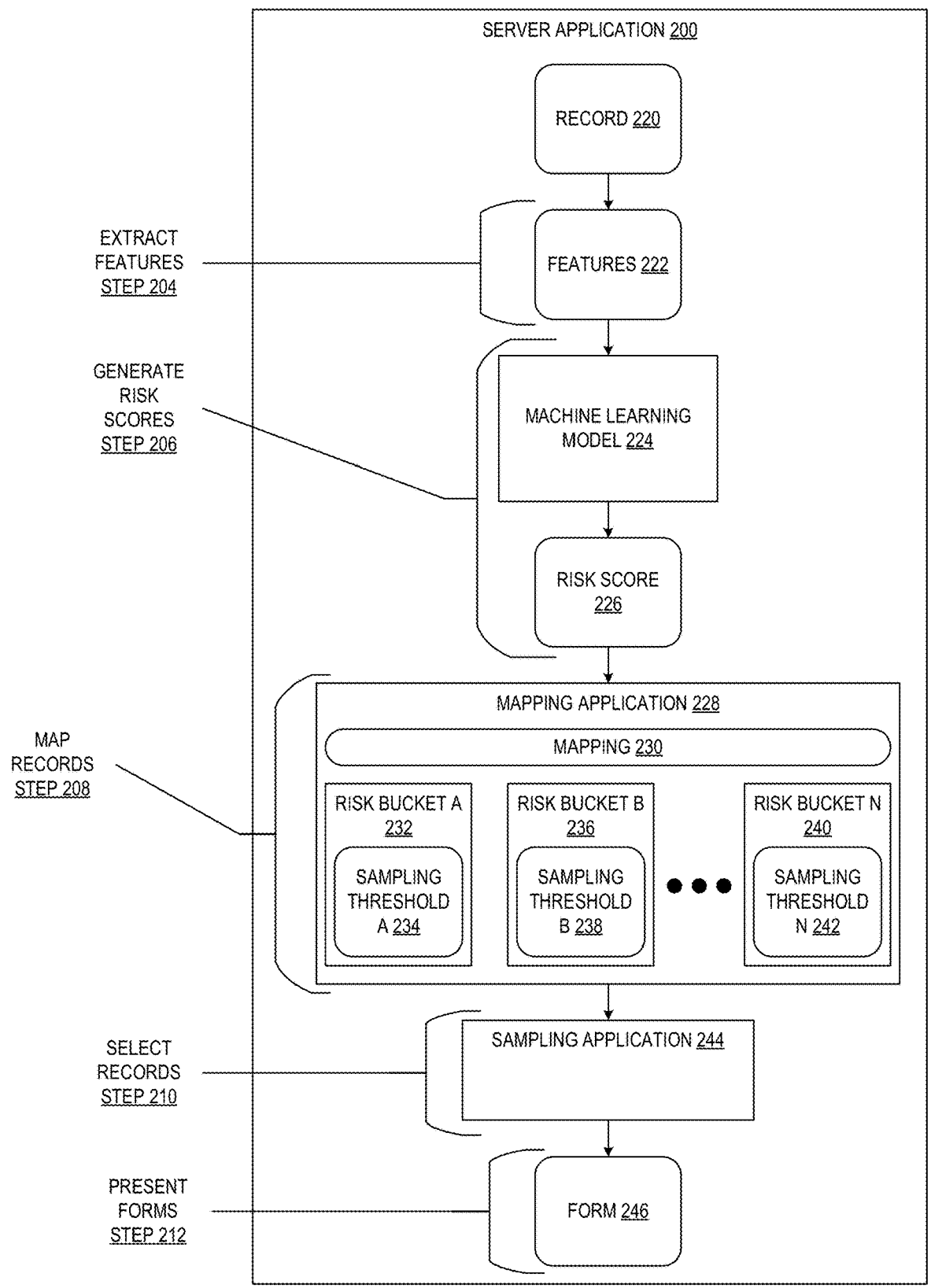
FIG. 2A and FIG. 2B show data and flow diagrams in accordance with disclosed embodiments.
Figure 2B:
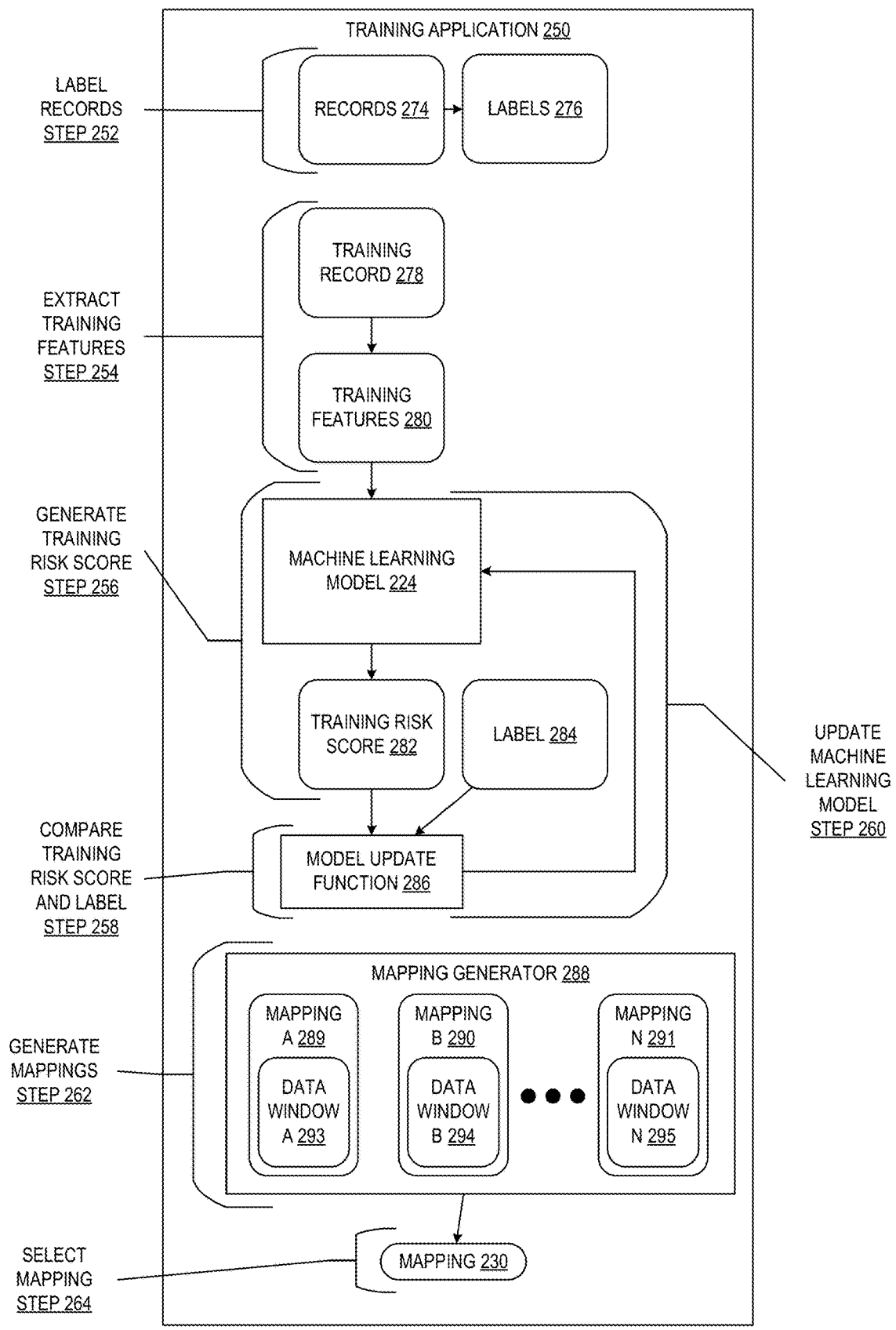

FIGS. 2A and 2B show data and flow diagrams of processes in accordance with the disclosure. FIG. 2A illustrates a data and flow diagram of a method that scores and samples records using machine learning models and mappings. FIG. 2B illustrates a data and flow diagram of methods for training and calibrating machine learning models and mappings. The embodiments of FIGS. 2A and 2B may be combined and may include or be included within the features and embodiments described in the other figures of the application. The features of FIGS. 2A and 2B are, individually and as an ordered combination, improvements to machine learning and form preparation technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the server application (200) generates risk scores, maps records, samples records, and presents forms. The server application (200) may execute as part of a server application on a server.

The record (220) is one of multiple records received by the system. The record (220) stores the values of a set of forms being processed by the system. In one embodiment, the record (220) includes the values from the fields of tax return forms and schedules. In one embodiment, the record (220) includes values from a tax return, which may include a 1040 form, a schedule A form, a schedule C form, a schedule D form, a schedule E form, a schedule F form, a 8949 form, a student information worksheet form, a W2 form, a 1099 form, etc. The values may be numerical values or categorical values.

At Step 204, features are extracted. For example, the features (222) are extracted from the record (220) (e.g., a tax return form). The features (222) include numerical data (e.g., amount of income) and categorical data (e.g., filing status "single", "married", etc.). The features (222) may also identify the number of forms included as part of the record. For example, the number of included schedule C forms, schedule D forms, schedule E forms, schedule F forms, $W_2$ forms, 1099 forms, etc., that are part of a tax return may be extracted from the record (220) and included in the features (222).

At Step 206, risk scores are generated. For example, the risk score (226) is generated from the features (222) using the machine learning model (224). In one embodiment, the risk score (226) is associated with the record (220) with a data structure that groups risk scores with the records from which the risk scores are generated. In one embodiment, the machine learning model (224) is a gradient boosted decision tree (e.g., using the XGBoost algorithm) trained to generate risk scores for records using record labels. The risk scores (including the risk score (226)) identify the probability that a form (e.g., a tax return) includes an error. In one embodiment, the risk score (226) is a rational number stored as floating point value with values from 0 to 1. Values closer 0 indicate a lower risk of an error in a record and values closer to 1 indicate a higher risk of an error in a record.

At Step 208, records are mapped. For example, the record (220) (corresponding to risk score (226)) is mapped to one of the risk buckets A (232), B (236), and N (240) using the risk score (226) and the mapping (230). The risk buckets A (232), B (236), and N (240) group records with similar risk scores. Each risk bucket includes a group of risk bucket records.

In one embodiment, the mapping (230) includes a group of risk bucket thresholds that are used to identify the risk bucket to which a record is mapped. For example, the risk bucket A (232) may have a risk bucket threshold of 0.87 so that each record with a corresponding risk score equal or above 0.87 are mapped to the risk bucket A (232).

The mapping (230) of the risk buckets A (232), B (236), and N (240) may be calibrated periodically for each risk bucket to receive the same number records over a given period of time (e.g., 1 day, 7 days, 14 days, etc.). Calibrating the risk buckets may be less computationally intensive than retraining the machine learning model (224) and be performed more often than retraining the machine learning model (224). In one embodiment, the risk buckets are recalibrated about every 10 days and the machine learning model (224) may be retrained monthly.

At Step 210, records are selected. For example, the record (220) is selected from one of the one of the risk buckets A (232), B (236), and N (240) using the sampling thresholds A (234), B (238), and N (242), with the sampling application (244). The risk buckets A (232), B (236), and N (240) are each assigned the corresponding sampling thresholds A (234), B (238), and N (242). The sampling thresholds identify the probability that one of the risk bucket records (within a risk bucket) will be selected to be presented to a reviewer. The sum of the sampling thresholds A (234) through N (242) may be equal to 1.

At Step 212, forms are presented. For example, the form (246) may be presented after being prepopulated with values from the record (220). The form (246) may be presented by transmitting form (246) to a client device that displays the form (246).

In one embodiment, a correction to the record (220) may be received from a client device. The correction may update a value in the record for a field of the form (246). For example, a correction to a tax return may update the filing status election, update the amount of income, a value in schedule C, etc.

In one embodiment, the form is sent with the correction to a second client device. For example, after being corrected by a reviewer, the form may be sent to the original preparer or the customer.

In one embodiment, the training records, used to train the machine learning model (224) are updated to include the record (220). The machine learning model (224) may be retrained with the training records after updating the training records. To include the record (220).

Turning to FIG. 2B, the training application (250) trains the machine learning model (224) and calibrates the mapping (230). The training application (250) may execute as part of a server application on a server, which may be different form the server that executes the server application (200) of FIG. 2A.

At Step 252, records are labeled. For example, the records (274) may be labeled with the labels (276). Each of the records (274) includes an initial version (e.g., corresponding to the form being completed by a preparer) and a filed version (e.g., corresponding to the form that was filed). The records are filtered to identify records for which there is no change to the record and to identify records that have been changed and are identified as including an error. When the initial version is the same as the filed version, the corresponding label indicates that there is no error in the record. When the initial version is not the same as the filed version and has been identified as including an error, the label indicates there is an error in the initial version of the record.

At Step 254, training features are extracted. For example, the training features (280) are extracted from the training record (278). The training record (278) is one of the records (274). In one embodiment, the training record (278) includes values from a tax return (referred to as a training tax return). The training features (280) include values from the training record (278) (e.g., income amount) and about the training record (278) (e.g., the number of $W_2$ forms).

At Step 256, training risk scores are generated. For example, the training risk score (282) is generated from the training features (280) using the machine learning model (224).

At Step 258, training risk scores and labels are compared. For example, the model update function (286) (which may be a program running on a server) compares the training risk score (282) to the label (284) to generate a comparison. The label (284) is one of the labels (276), which was generated for the training record (278).

At Step 260, the machine learning model (224) is updated. The machine learning model (224) is updated based on the comparison as a part of the model update function (286). The weights, values, and parameters of the machine learning model (224) may be updated proportionately to the comparison between the training risk score (282) and the label (284).

The Steps 262 and 264 calibrate the mapping (230). The mapping (230) is used to assign records to risk buckets.

At Step 262, mappings are generated. For example, the mapping generator (a program running on a server) automatically generates the mappings A (289), B (290), and N (291). Each of the mappings A (289), B (290), and N (291) includes a set of risk bucket thresholds that may be used to assign records to risk buckets based on the risk scores of the records. Each of the mappings A (289), B (290), and N (291) corresponds to one of the data windows A (293), B (294), and N (295). The data windows A (293), B (294), and N (295) identify a window of time for the data used to generate the mappings A (289), B (290), and N (291). The data window A (293) may be for a single day, the data window B (294) may be for 2 days, the data window N (295) may be for 10 days, etc. For example, using the data window A (293), the mapping A (289) is generated using records (e.g., tax returns) that have been received by the system the prior day.

At Step 264, mappings are selected. The mapping generator (288) selects one of the mappings A (289), B (290), and N (291) to use as the mapping (230). In one embodiment, the selected mapping having the lowest standard deviation for the number of records in each risk bucket defined by the respective mapping is selected. For example, with three risk buckets and fifteen records, the mapping with the lowest standard deviation would have five returns in each risk bucket and be selected as the mapping to be used by the system.

Figure 3:
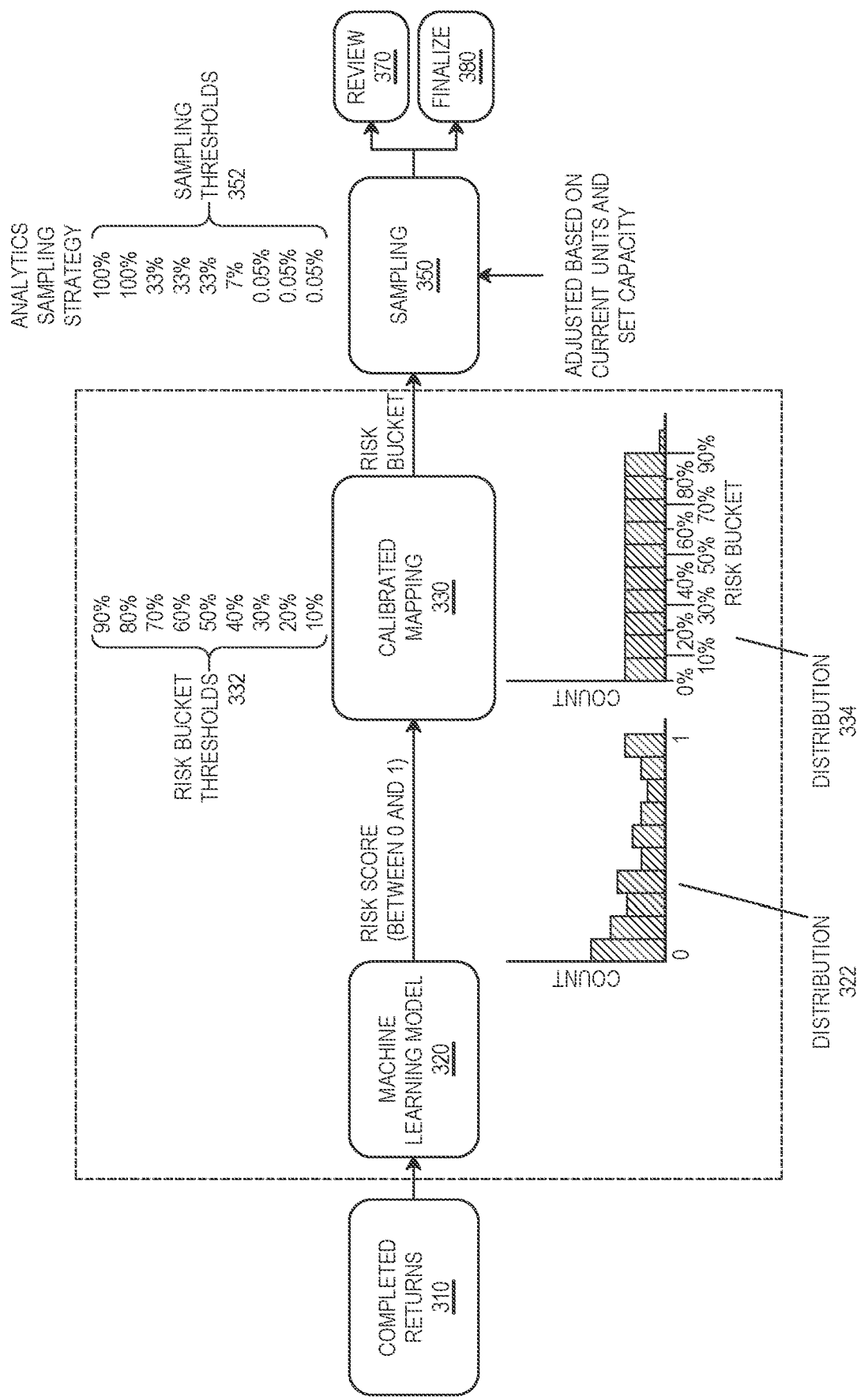
Figure 4A:
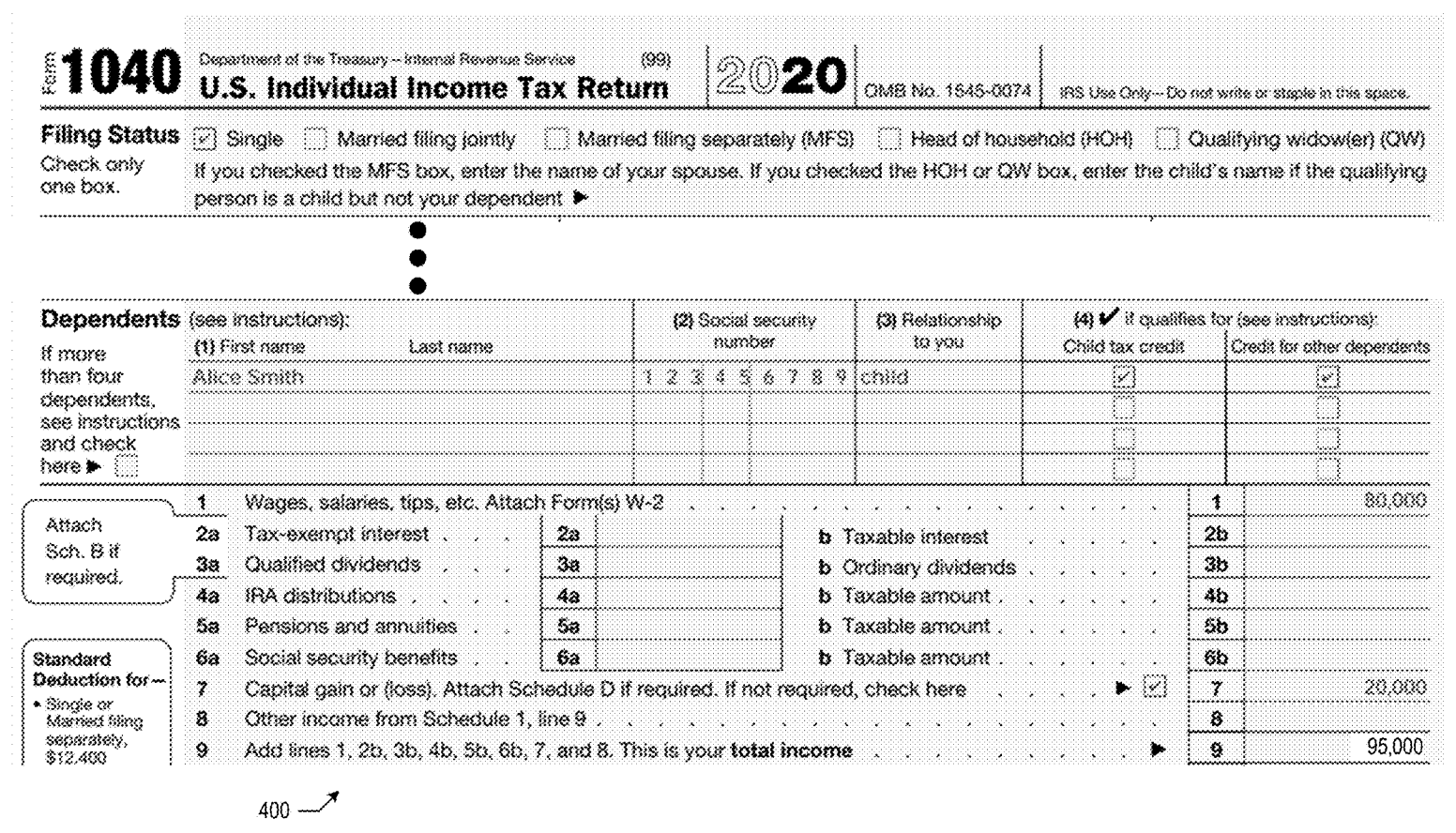
Figure 4B:
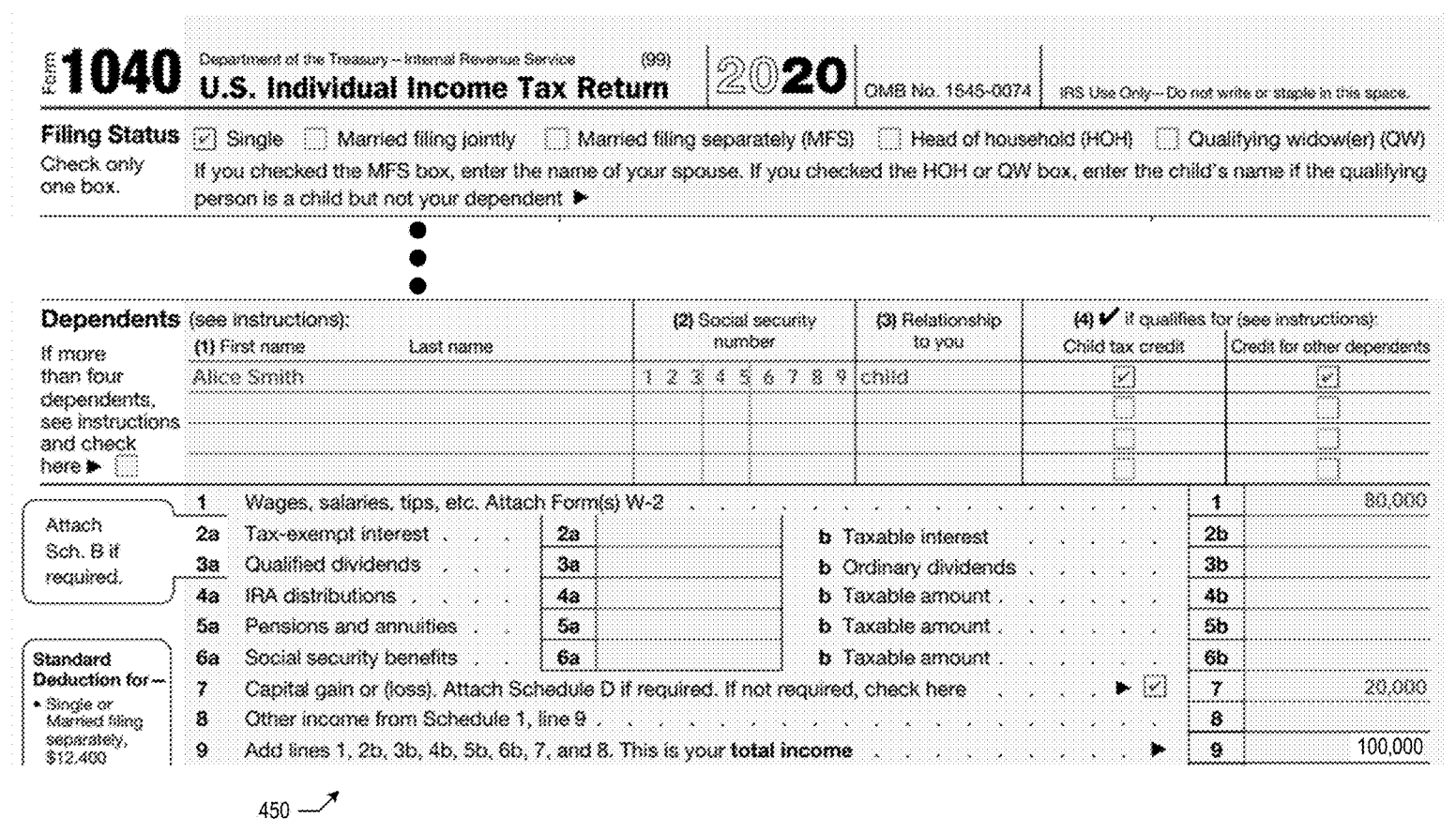

FIGS. 3, 4A, and 4B show examples of systems that implement calibrated risk scoring and sampling. FIG. 3 shows an example of processing completed forms (e.g., returns). FIGS. 4A and 4B show an example of a from that is identified and sampled for review and then updated. The embodiments shown in FIGS. 3, 4A, and 4B may be combined and may include or be included within the features and embodiments described in the other figures of the application. The features and elements of FIGS. 3, 4A, and 4B are, individually and as a combination, improvements to machine learning and form preparation technology and computing systems. The various features, elements, widgets, components, and interfaces shown in FIGS. 3, 4A, and 4B may be omitted, repeated, combined, and/or altered as shown. Accordingly, the scope of the present disclosure should not be considered limited to the specific arrangements shown in FIGS. 3, 4A, and 4B.

Turning to FIG. 3, the completed returns (310) are received by the system. The completed returns (310) are stored as records and were prepared by a preparer using a client device.

The machine learning model (320) receives the completed returns (310) and generates risk scores for each of the completed returns (310). The distribution (322) of the risk scores for the completed returns (322) does not uniformly distribute the records of the completed returns to the risk buckets used by the system.

The calibrated mapping (330) includes the risk bucket thresholds (332). The risk bucket thresholds (332) are used to map the completed returns (310) to the risk buckets of the system. Using the risk bucket thresholds (332) converts the distribution of the records from the non-uniform distribution (332) to the uniform distribution (334).

The sampling (350) uses the sampling thresholds (352) to identify the probability that a return will be reviewed. For example, with a risk bucket with a (100)% sampling threshold will have (100)% of the returns in the risk bucket reviewed. A risk bucket with a 33% sampling threshold will have 33% of the returns in the risk bucket reviewed.

In one embodiment, a random number between 0 and 1 is generated. If the number is below the sampling threshold, then the record is sent to the review process (370). Otherwise, the record is sent to the finalize process (380).

The review process (370) is an automated computer process, that prepopulates a form with the values from a record of one of the completed returns (310). The prepopulated form is sent to and displayed by a client device operated by a reviewer.

The finalize process (380) is an automated computer process. In one embodiment, the finalize process (380) prepopulates the form, may send the from to the customer for review, and may file the form electronically.

Turning to FIG. 4A, the form (400) is a tax return form (Form 1040) that has been completed by a preparer. Line 9 of the form (400) contains an error for the value of total income. The system maintains a record of the form (400). The record is input to a machine learning model to generate a risk score. The risk score is 0.9 indicating a high likelihood of an error in the record of the form (400). The record of the form is mapped to a risk bucket with risk bucket thresholds above and below the risk score 0.9. The risk bucket has a sampling threshold (e.g., (100)%) that is compared to a random value for whether the record of the form (400) will be reviewed. The record of the form (400) is selected for review and sent to a reviewer.

Turning to FIG. 4B, the form (450) is updated from the form (400). The total income of line 9 is updated to reflect the income from lines 1 and 9. The underlying record is also update and the form (450) may be electronically filed.

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and (508)) may be locally or remotely connected to the computer processor(s) (502), non-persistent storage (504), and persistent storage (506). Many different types of computing systems exist, and the aforementioned input and output device(s) (510 and (508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
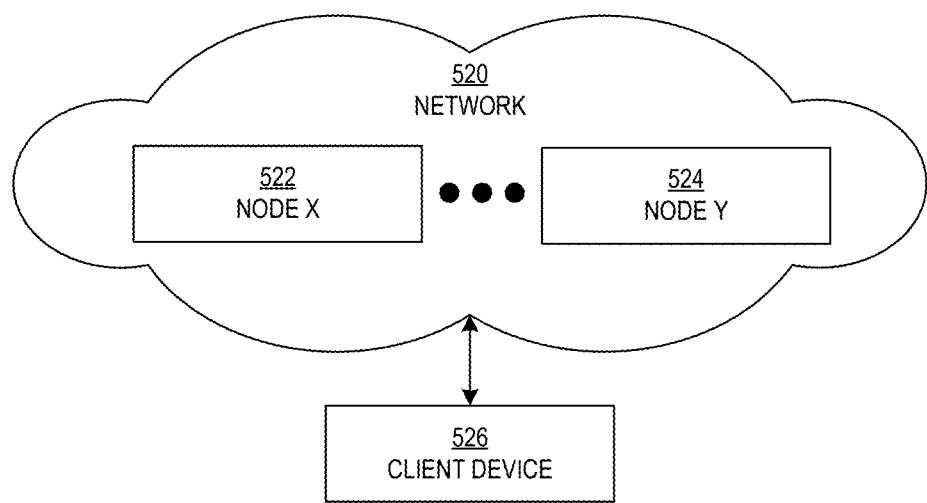

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   extracting features from a record;
   generating a risk score, associated with the record, from the features using a machine learning model, wherein the machine learning model is trained to generate risk scores using a plurality of record labels;
   mapping the record to a risk bucket of a plurality of risk buckets, using the risk score, wherein the risk bucket comprises a plurality of risk bucket records;
   selecting the record, from the plurality of risk bucket records, using a sampling threshold of a plurality of sampling thresholds corresponding to the plurality of risk buckets, wherein the sampling threshold identifies a probability of selecting one of the plurality of risk bucket records from the risk bucket; and
   presenting, to a client device, a form using a processor that prepopulates the form with values from the record.

2. The method of claim 1, further comprising:
   receiving a correction to the record from the client device; and
   sending the form with the correction to a second client device.

3. The method of claim 1, wherein the record comprises values from a tax return comprising one or more of a 1040 form, a schedule A form, a schedule C form, a schedule D form, a schedule E form, an 8949 form, or a student information worksheet form.

4. The method of claim 1, wherein the features include a number of exemptions value, a number of schedule C forms value, a number of schedule D forms value, a number of schedule E forms value, a number of schedule F forms value, a number of W2 forms value, or a number of 1099 forms value.

5. The method of claim 1, further comprising labeling a plurality of training records to generate the plurality of record labels.

6. The method of claim 1,
   wherein the machine learning model is a gradient boosted decision tree, and
   wherein the features comprise numerical values and categorical values from a tax return corresponding to the record.

7. The method of claim 1, further comprising:
training the machine learning model to generate risk scores using the plurality of record labels, wherein the machine learning model is trained by:
extracting training features from a training record of a plurality of training records,
generating a training risk score, for the training record, from the training features using the machine learning model,
comparing the training risk score to a record label, of the record labels, to generate a comparison, and
updating the machine learning model using the comparison.

8. The method of claim 1, further comprising:
updating a plurality of training records to include the record; and
retraining the machine learning model with the training records after updating the training records.

9. The method of claim 1, further comprising:
calibrating a mapping of a plurality of training risk scores to the plurality of risk buckets, wherein the mapping is calibrated by:
generating a plurality of mappings corresponding to a plurality of data windows, and
selecting the mapping from the plurality of mappings using a plurality of standard deviations generated using the plurality of mappings.

10. The method of claim 1, further comprising assigning the plurality of sampling thresholds to the plurality of risk buckets comprising the risk bucket.

11. A system comprising:
a machine learning model trained to generate a risk score from features extracted from a record; and
a server application executing on one or more servers and configured for:
extracting the features from the record,
generating the risk score, associated with the record, from the features using the machine learning model, wherein the machine learning model is trained to generate risk scores using a plurality of record labels,
mapping, with a mapping application, the record to a risk bucket of a plurality of risk buckets, using the risk score, wherein the risk bucket comprises a plurality of risk bucket records,
selecting, with a sampling application, the record, from the plurality of risk bucket records, using a sampling threshold of a plurality of sampling thresholds corresponding to the plurality of risk buckets, wherein the sampling threshold identifies a probability of selecting one of the plurality of risk bucket records from the risk bucket, and
presenting, to a client device, a form using a processor that prepopulates the form with values from the record.

12. The system of claim 11, wherein the server application is further configured for:
receiving a correction to the record from the client device, and
sending the form with the correction to a second client device.

13. The system of claim 11, wherein the record comprises values from a tax return comprising one or more of a 1040 form, a schedule A form, a schedule C form, a schedule D form, a schedule E form, an 8949 form, or a student information worksheet form.

14. The system of claim 11, wherein the features include a number of exemptions value, a number of schedule C forms value, a number of schedule D forms value, a number of schedule E forms value, a number of schedule F forms value, a number of W2 forms value, or a number of 1099 forms value.

15. The system of claim 11, wherein the server application is further configured for labeling a plurality of training records to generate the plurality of record labels.

16. The system of claim 11, wherein the machine learning model is a gradient boosted decision tree, and wherein the features comprise numerical values and categorical values from a tax return corresponding to the record.

17. The system of claim 11, further comprising a training application configured for:
training the machine learning model to generate risk scores using the plurality of record labels, wherein the machine learning model is trained by:
extracting training features from a training record of a plurality of training records,
generating a training risk score, for the training record, from the training features using the machine learning model,
comparing the training risk score to a record label of the plurality record labels, to generate a comparison, and
updating the machine learning model using the comparison.

18. The system of claim 11, wherein the server application is further configured for updating a plurality of training records to include the record, and retraining the machine learning model with the training records after updating the training records.

19. The system of claim 11, wherein the server application is further configured for calibrating a mapping of a plurality of training risk scores to the plurality of risk buckets, wherein the mapping is calibrated by:
generating a plurality of mappings corresponding to a plurality of data windows, and
selecting the mapping from the plurality of mappings using a plurality of standard deviations generated using the plurality of mappings.

20. A method comprising:
receiving a record,
wherein features are extracted from the record,
wherein a risk score, associated with the record, is generated from the features using a machine learning model, wherein the machine learning model is trained to generate risk scores using a plurality of record labels,
wherein the record is mapped to a risk bucket of a plurality of risk buckets using the risk score,
wherein the risk bucket comprises a plurality of risk bucket records, and
wherein the record is selected from the plurality of risk bucket records using a sampling threshold of a plurality of sampling thresholds corresponding to the plurality of risk buckets, wherein the sampling threshold identifies a probability of selecting one of the plurality of risk bucket records from the risk bucket; and
presenting a form using a processor that prepopulates the form with values from the record.

* * * * *